Figure 1:
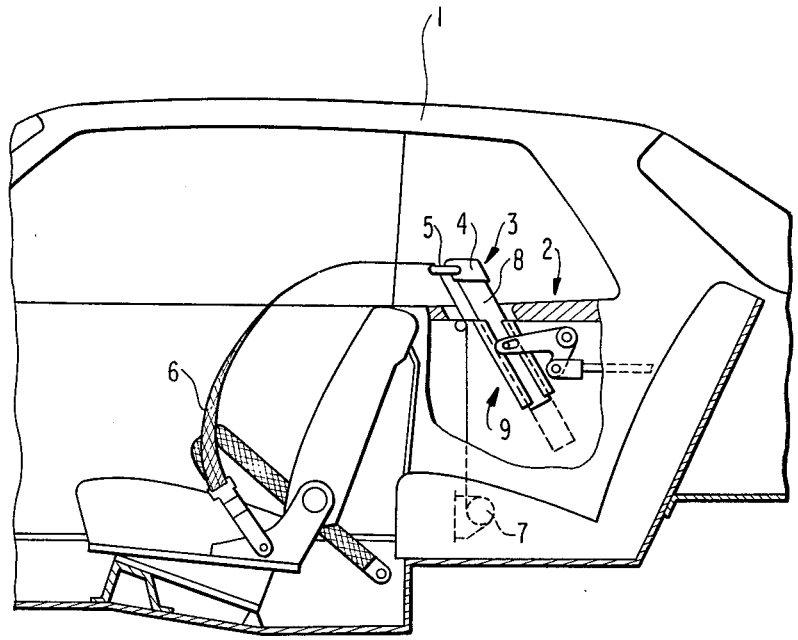

United States Patent [19]

Sacco et al.

[11] 4,213,638

[45] Jul. 22, 1980

[54] INSTALLATION FOR CHANGING THE POSITION OF AN UPPER FASTENING OR DEFLECTION POINT OF A SAFETY BELT

[75] Inventors: Bruno Sacco; Walter Dalheimer, both of Sindelfingen; Friedrich Schwarz, Deckenpfronn, all of Fed. Rep. of Germany

[73] Assignee: Daimler-Benz Aktiengesellschaft, Fed. Rep. of Germany

[21] Appl. No.: 935,961

[22] Filed: Aug. 22, 1978

[30] Foreign Application Priority Data

Aug. 24, 1977 [DE] Fed. Rep. of Germany ....... 2738140

[51] Int. Cl.² ............................................ B60R 21/10
[52] U.S. Cl. .................................... 280/808; 297/483
[58] Field of Search ................ 280/808, 804; 297/473, 297/483

[56] References Cited

U.S. PATENT DOCUMENTS

| 3,829,123 | 8/1974 | Holka | 280/747 |
| 4,060,260 | 11/1977 | Collins | 280/747 |
| 4,093,274 | 6/1978 | Scholz et al. | 280/747 |

*Primary Examiner*—Robert R. Song
*Attorney, Agent, or Firm*—Craig & Antonelli

[57] ABSTRACT

An installation for changing the position of the upper fastening or deflection point, especially of the deflection fitting of a three-point safety belt with automatic belt roll-up mechanism in a two-door passenger motor vehicle without center column, in which the deflection fitting is provided at the upper end of a bearer adapted to be transferred from a lower rest position covered off by the inner vehicle side wall covering, into an upper use position projecting beyond the side wall covering.

19 Claims, 3 Drawing Figures

INSTALLATION FOR CHANGING THE POSITION OF AN UPPER FASTENING OR DEFLECTION POINT OF A SAFETY BELT

The present invention relates to an installation for changing the position of the upper fastening, respectively, deflection point, especially of the deflection fitting of a three-point safety belt with a belt roll-up mechanism in a two-door passenger motor vehicle without center columns.

In order to obtain an optimum lay-out and disposition of the shoulder belt part, which is not perceived as disturbing by the user and which in case of impact fulfills its function under greatest possible protection of the user, the upper fastening, respectively, deflection point must be located in an accurately predetermined area. Especially with passenger motor vehicles without center column as a rule with two-door passenger motor vehicles of this type, this is possible only by the use of special means, since with such types of vehicles the predetermined fastening area is located within the area of a side windowpane unsuitable for fastening purposes.

In order to take into account the requirements in such a case, it is known to pivotally arrange a shackle or lug at the inner roof longitudinal bearer which carries at its free end the fitting, through which the belt runs, and which during the fastening of the safety belt is transferred into a predetermined position by an automatic inclining thereof. This prior art solution, however, impairs the overall appearance of the vehicle, especially with lowered side windows and additionally reduces the visibility toward the outside.

It is the aim of the present invention to indicate a solution with fulfillment of the criteria known for achieving an optimum shoulder belt arrangement, which does not disturbingly influence the appearance of the motor vehicle and which only impairs insignificantly the visibility toward the outside.

Consequently, an installation for changing the position of the upper fastening, respectively, deflection point, especially of the deflection fitting of a three-point safety belt with belt roll-up mechanism in a two-door passenger motor vehicle without center column is proposed, whereby according to the present invention the deflection fitting is mounted at the upper end of a bearer which is adapted to be transferred from a lower rest position covered off by the inner side wall covering, into an upper use position projecting beyond the side wall covering.

In a preferred embodiment of the present invention, the bearer forms the telescopically displaceable part of a rail, onto which the adjustment movements of a servo-drive are transmitted.

According to a further feature of the present invention, the deflection fitting can be covered off by an end-cover or shield forming in the rest position a surface with the adjoining side wall covering. As a result thereof, in addition to a better appearance, also a convenient ingress and egress to and from the rear seating places is achieved.

In order that in the use position no foreign bodies can reach the shaft of the side wall covering receiving the bearer and in order than an injury danger is precluded during the retraction of the bearer, the upper end of the bearer may be provided with a covering adjoining the end-cover or shield, whose height is greater than the maximum stroke of the bearer.

In the determination of the use position for the deflection fitting, the body size of the belt user can then be taken into consideration in a simple manner if the stroke height of the bearer is adjustable. This can be achieved, for example, by a limit switch adjustable in height.

According to a further feature of the present invention, the triggering command for the retraction, respectively, the extension of the bearer can be initiated by a coordinated switch which may be, for example, the ignition starter switch, a seat contact switch or a switch responsive to movements of the belt band.

Accordingly, it is an object of the present invention to provide an installation for changing the position of the upper fastening or deflection point, especially of the deflection fitting of a three-point safety belt in a two-door passenger motor vehicle without center columns, which avoids by extremely simple means the aforementioned shortcomings and drawbacks encountered in the prior art construction.

Another object of the present invention resides in an installation for changing the position of the upper fastening or deflection point of a safety belt of motor vehicles which does not impair the overall appearance of the vehicle, especially with lowered side windows.

A further object of the present invention resides in an installation for changing the position of the upper fastening or deflection point of a safety belt of the type described above which does not reduce the visibility from within the vehicle toward the outside.

A still further object of the present invention resides in an installation for changing the position of the upper deflection fitting of a three-point safety belt with automatic belt wind-up mechanism in a two-door passenger motor vehicle without center columns which fulfills all known criteria for attaining an optimum shoulder belt course to achieve maximum passenger protection, yet is simple in construction, reliable in operation, and contributes to the avoidance of unsightly parts when viewing the vehicle.

A further object of the present invention resides in an installation of the type described above which in addition to the aims and objects mentioned hereinabove, also realizes convenient access to the rear seats in a two-door vehicle.

Still a further object of the present invention resides in an installation for changing the position of the upper fastening or deflection point of a safety belt, which effectively prevents the penetration of parts into the shaft receiving the bearer while at the same time minimizing the injury danger during the retraction of the bearer.

Still another object of the present invention resides in an installation of the type described above, by means of which the height of the body of the belt user can be taken into consideration by simple means.

Figure 2:
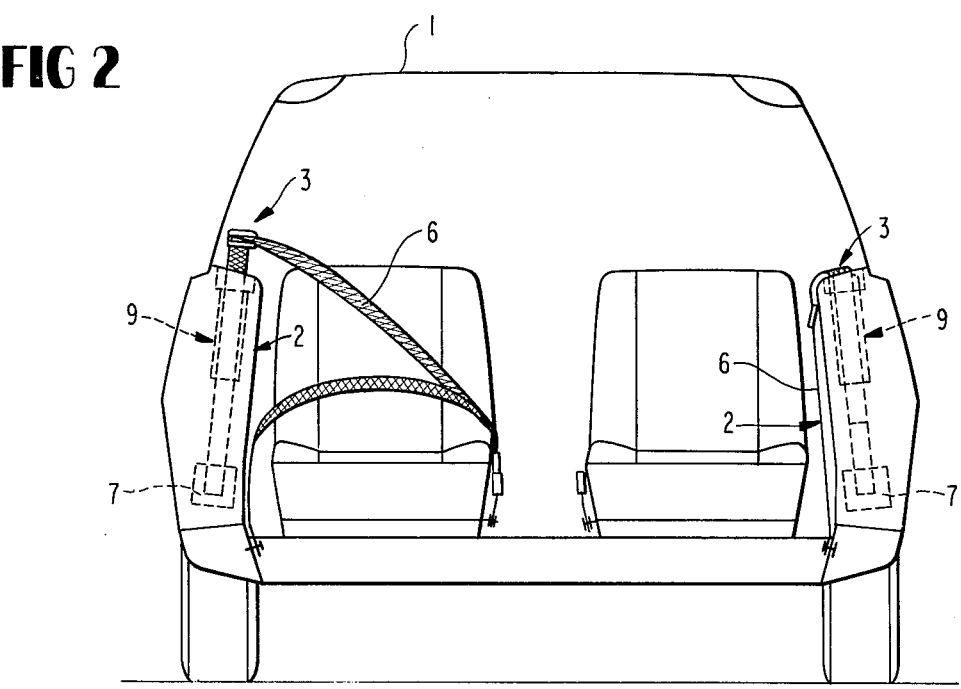
Figure 3:
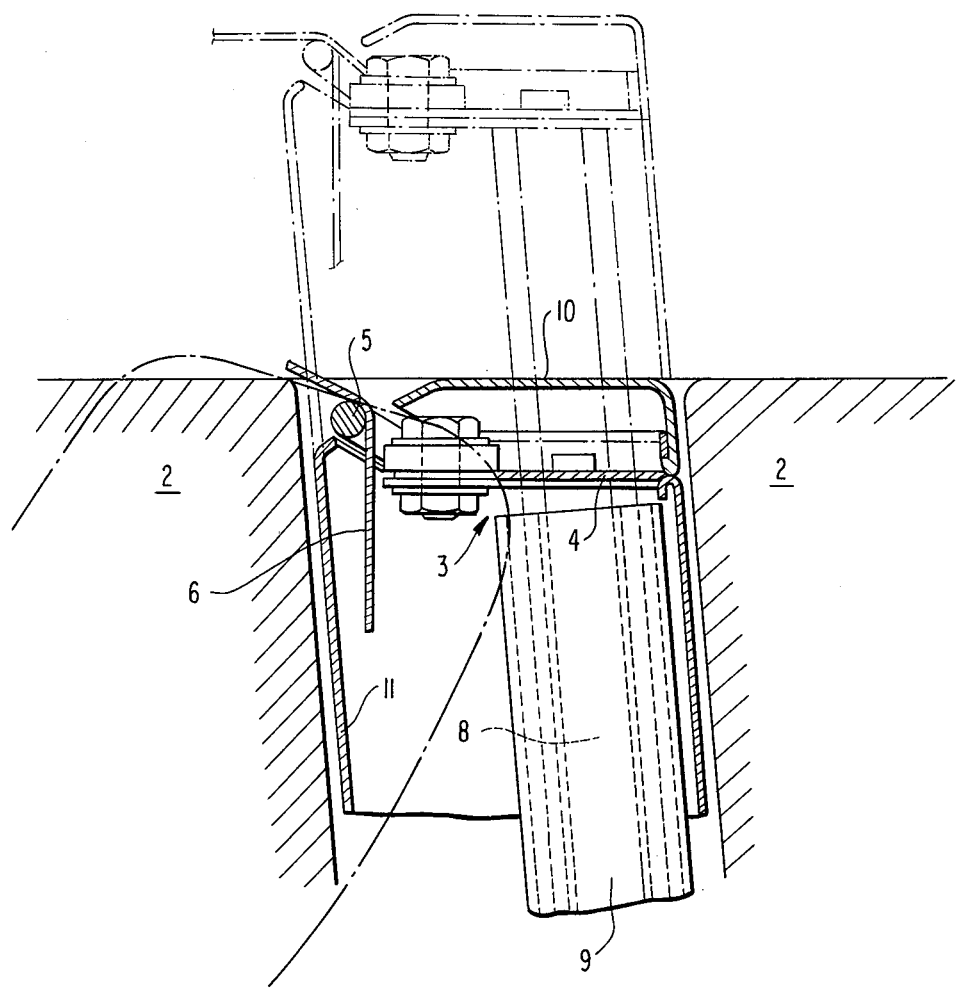

These and further objects, features and advantages of the present invention will become more apparent from the following description when taken in connection with the accompanying drawing which shows, for purposes of illustration only, two embodiments in accordance with the present invention, and wherein:

FIG. 1 is a somewhat schematic longitudinal cross-sectional view through a motor vehicle illustrating an installation for changing the position of the upper fastening or deflection point of a safety belt in accordance with the present invention in its operating position;

FIG. 2 is a somewhat schematic front elevational view of the installation for changing the position of the upper fastening or deflection point of a safety belt as shown in FIG. 1, with a further such installation according to FIG. 1 lowered into its rest position; and FIG. 3 is a somewhat schematic partial enlarged view, partly in cross section, of the belt deflection area in a modified embodiment of an installation for changing the position of the upper fastening or deflection point of a safety belt in accordance with the present invention.

Referring now to the drawing wherein like reference numerals are used throughout the various views to designate like parts, in a two-door passenger motor vehicle 1 without center columns, which is not illustrated in detail, the side wall covering thereof generally designated by reference numeral 2 receives a bearer generally designated by reference numeral 3; the deflection fitting 5 of a three-point safety belt 6 with an automatic belt wind-up mechanism 7 is arranged at the upper end 4 of the bearer 3.

The bearer 3 forms the telescopically displaceable part 8 of a rail generally designated by reference numeral 9 and is transferred by the adjustment movements of a conventional servo-drive (not shown) from a lower rest position covered by the side wall covering 2 (FIG. 2, right side) into an upper use position projecting beyond the side wall covering 2 (FIG. 1 and FIG. 2, left side).

The bearer 3 which is illustrated in FIG. 3 in full lines in its rest position and in dash and dotted lines in its uppermost use position, includes a shield or end-cover 10 covering the deflection fitting 5, which forms a common surface with the adjoining areas of the side wall covering 2 in the rest position of the bearer 3. A lateral covering 11 adjoining the shield or end-cover 10 in the downward direction, whose height is greater than the maximum extension length of the bearer 3, prevents a penetration of foreign bodies and a jamming of body or clothing parts of the passengers during the retraction of the bearer 3.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for changing the position of the upper fastening or deflection point of a safety belt, including a deflection fitting means and means for bearing said deflection fitting means and for changing the position of said deflection fitting means from a lower rest position to a raised use position at least during the period while the safety belt is being used, said deflection fitting means being provided at the upper end of the bearing and position-changing means, and, the bearing and position-changing means being covered off by an inner side wall covering means while in said lower rest position and projecting beyond the side wall covering means while in said raised use position at least during the period while the safety belt is being used.

2. An installation according to claim 1, characterized in that the installation is for changing the position of the deflection fitting of a three-point safety belt with an automatic belt roll-up mechanism in a two-door passenger motor vehicle without center columns.

3. An installation according to claim 1 or 2, characterized in that the bearing and position-changing means forms the telescopically displaceable part of a rail means, onto which the adjustment movements of a servo-drive means are transmitted.

4. An installation according to claim 3, characterized in that the deflection fitting means is covered off by a shield means forming a substantially common surface with the adjoining side wall covering means in the rest position.

5. An installation according to claim 4, characterized in that the upper end of the bearing and position-changing means is provided with a covering adjoining the shield means, whose height is larger than the maximum stroke of the bearing and position-changing means.

6. An installation according to claim 5, characterized in that the stroke height of the bearing and position-changing means is adjustable.

7. An installation according to claim 6, characterized in that said stroke height is adjustable such that the body size of the belt user can be taken into consideration.

8. An installation according to claim 5, characterized in that the starting command for the retraction and extension of the bearing and position-changing means is triggered by a coordinated switch means.

9. An installation according to claim 8, characterized in that the switch means is an ignition starter switch.

10. An installation according to claim 8, characterized in that the switch means is a seat contact switch.

11. An installation according to claim 8, characterized in that the switch means is a switch responsive to movements of the belt band.

12. An installation according to claim 8, characterized in that the stroke height of the bearing and position-changing means is adjustable.

13. An installation according to claim 12, characterized in that said stroke height is adjustable such that the body size of the belt user can be taken into consideration.

14. An installation according to claim 1 or 2, characterized in that the deflection fitting means is covered off by a shield means forming a substantially common surface with the adjoining side wall covering means in the rest position.

15. An installation according to claim 14, characterized in that the upper end of the bearing and position-changing means is provided with a covering adjoining the shield means, whose height is larger than the maximum stroke of the bearing and position-changing means.

16. An installation according to claim 1 or 2, characterized in that the stroke height of the bearer means is adjustable.

17. An installation according to claim 16, characterized in that said stroke height is adjustable such that the body size of the belt user can be taken into consideration.

18. An installation according to claim 1 or 2, characterized in that the starting command for the retraction and extension of the bearing and position-changing means is triggered by a coordinated switch means.

19. An installation according to claim 1 or 2, characterized in that said bearing and position-changing means is received in the side wall covering means.

* * * * *